(12) United States Patent
Morando

(10) Patent No.: US 8,784,727 B2
(45) Date of Patent: Jul. 22, 2014

(54) MOLTEN METAL FURNACE

(76) Inventor: Jorge A Morando, Solon, OH (US)

(*) Notice: Subject to any disclaimer, the term of this patent is extended or adjusted under 35 U.S.C. 154(b) by 0 days.

(21) Appl. No.: 13/402,590

(22) Filed: Feb. 22, 2012

(65) Prior Publication Data

US 2013/0249149 A1 Sep. 26, 2013

Related U.S. Application Data

(60) Provisional application No. 61/506,121, filed on Jul. 10, 2011.

(51) Int. Cl.
*F27B 3/26* (2006.01)

(52) U.S. Cl.
USPC .......................... 266/242; 266/903

(58) Field of Classification Search
USPC ................ 266/200, 242, 903; 432/209
See application file for complete search history.

(56) References Cited

U.S. PATENT DOCUMENTS

| 2,137,693 | A | * | 11/1938 | Lundt | 432/209 |
| 2,385,333 | A | * | 9/1945 | Johnson et al. | 266/200 |
| 4,353,532 | A | * | 10/1982 | Jay | 266/242 |
| 4,432,791 | A | * | 2/1984 | Jayaraman et al. | 75/686 |
| 2009/0136884 | A1 | * | 5/2009 | Jepson | 432/14 |

* cited by examiner

*Primary Examiner* — Scott Kastler
(74) *Attorney, Agent, or Firm* — Vincent Re PLLC

(57) ABSTRACT

An improved molten metal furnace including an enlarged buffer plate of nickel-based superalloy material which seals and separates the furnace burners from the product to be heated. The seal from the buffer plate provides for the creation of a generally inert atmosphere for the bath of molten metal. Additionally, angling the interconnecting passageways between the furnace regions improve the thermal efficiency of the circulating molten metal.

10 Claims, 7 Drawing Sheets

MOLTEN METAL FURNACE

CROSS-REFERENCE TO RELATED APPLICATIONS

This application claims priority of U.S. Provisional Patent Application filed Jul. 10, 2011 having Ser. No. 61/506,121.

FIELD OF THE INVENTION

The present disclosure pertains to direct-fired heating and/or melting furnaces, such as aluminum furnaces, and to reducing the heat energy input to effectively melt the heated product while providing an inert atmosphere within the furnace that minimizes or prevents undesirable reactions from occurring to the heated product.

BACKGROUND OF THE INVENTION

A typical molten metal facility includes a furnace with one or more pumps for moving molten metal. During the processing of molten metals, such as aluminum, the molten metal is normally continuously circulated through the furnace by a centrifugal impeller pump, i.e., a circulation pump, to equalize the temperature of the molten bath. A typical furnace includes a pump well that is located between the heating chamber or hearth and the charge well (where raw material is inserted into the furnace). These three main sections of a typical furnace are fluidly interconnected with the circulation pump causing the molten metal to circulate from the pump well to the charge well to the hearth and back into the pump well.

In conventional direct-fired (fuel-fired) heating or melting furnaces, gas fueled burners produce a flame and/or products of combustion directly above the melt or load. Heat is transferred directly, from the flame and/or combustion products, to the melt by a combination of radiation and convection.

This method of melting has the problem that it is very inefficient. To prevent the waste gases/fuel from the burners coming into contact with the melt, the burners are typically mounted within the furnace at least four feet above the top surface of the molten metal (metal line). Because of this distance and although aluminum melts at just over 1200° F., conventional furnaces are run at approximately 2100° F. to ensure that a sufficient heat load is impinged on the metal to melt it fully (i.e., to the furnace floor). In this method of heating, large quantities of heat/energy are lost as they are exhausted up the stack.

Additionally, in these aluminum melting furnaces, the oxygen, hydrogen and carbon dioxide in the ambient air reacts with aluminum to form aluminum oxide or dross. Dross formation (i.e., aluminum oxidation) is undesirable in that it reduces aluminum yield. Depending on the type of charge materials to be melted, approximately 5% to 10% of the aluminum charged can be oxidized. This increases operational costs, due to the loss of the un-recovered aluminum, the labor and time requirements for skimming the dross from the furnace, and also energy losses from heating the dross within the furnace. That is, aluminum oxide has a characteristically low thermal conductivity and therefore greatly inhibits heat transfer to the molten aluminum as a dross layer acts as an insulator at the melt's surface, thus reducing the effectiveness of heat transfer from the burner to the aluminum.

For the above reasons, conventional furnaces operate at 20-30% efficiency because heat transfer to the melt in the furnace primary occurs through radiation from the overhead gas burners to the melt over a substantial gap and the insulative effect provided by the dross formed atop the molten metal.

There is therefore a need for a furnace that both reduces the thermal energy needed to effectively melt a heated product and significantly reduces the formation of dross in the molten metal.

SUMMARY OF THE INVENTION

The above and other disadvantages of prior art furnaces are overcome by the present invention of an improved furnace of the type having a buffer plate that completely separates the furnace's burners from the bath of molten metal. The improvement of the invention comprises a buffer plate formed from a nickel-based superalloy that is mounted within a molten metal furnace above the metal line and below the furnace burners.

Nitrogen is an inert gas that will generally exhibit little or no tendency to react with the load material, such as aluminum, in comparison to oxygen and other combustion gases present in the furnace.

Systems and corresponding methods are described herein that provide a furnace burner chamber that is separated from the metal product or load by a superalloy buffer plate which receives the thermal energy from the burners and transmits that energy with little thermal losses to the metal product or load.

Systems and corresponding methods are described herein that provide a sealed molten metal chamber filled with an effective amount of inert gas over the surface of a metal product or load in a heating and/or melting furnace.

Systems and corresponding methods are described herein that provide a furnace having a superalloy buffer plate that is preferably mounted less than one foot beneath the furnace's burner(s) and is less than eight inches from the metal product or load. The buffer plate sealing the burners from the metal product. In an aluminum furnace, the smaller gap between burner and load allows the burner temperatures to be lowered to 1640° F. from the 2100° F. of a conventional furnace.

As described herein, a system comprises a furnace configured to receive a product to be thermally treated within the furnace, where the furnace includes at least one burner which provides heat to the product disposed within the furnace. The furnace includes an enlarged buffer plate or sheet nickel-based superalloy material which seals and separates the furnace burners from the product to be heated. The nickel content within the superalloy being sufficient to form a layer of black nickel oxide resulting in the superalloy having a thermal emissivity coefficient of approximately 0.96 to 0.98.

As further described herein, the buffer plate seals the product chamber and allowing an inert gas to be delivered into the furnace beneath the buffer plate so as to protect a surface of the product and minimize or prevent the product from chemically reacting with any other gases within the furnace. Further, the inert gas will impregnate any porosity in the refractory material of the furnace walls to substantially reduce erosion of the refractory material and the formation of other undesirable by-products, such as spinel.

It is an advantage of the present invention to provide an improved molten metal furnace comprising: a molten metal reservoir adapted to retain a bath of molten metal; a heater proximate to the reservoir, wherein the heater is surrounded by an atmosphere comprising air and heater exhaust gases; and a buffer plate disposed between the bath of molten metal and the at least one heater, wherein the buffer plate seals and separates the molten metal bath from the heater atmosphere.

It is another advantage of the present invention to provide angled furnace passageways which redirect the hotter molten metal coming from the upper regions of the hearth downwardly to the pump and to redirect the relatively cooler molten metal from the charge well toward the hotter molten metal within the hearth.

It is still another advantage of the present invention to line the angled furnace passageways with a durable ceramic liner to prevent erosion of the furnace refractory walls containing these passageways.

A method of protecting a product being heated within a furnace is also provided herein. The method comprises providing a source of oxygen and a carbon-based fuel source to at least one burner of the furnace to generate combustion gases, providing a buffer plate between the at least one burner and the product being heated to form an upper burner chamber and a lower product chamber, delivering the combustion gases within the furnace to the buffer plate thereby transmitting thermal energy into the buffer plate, delivering the thermal energy within the buffer plate to the product, and delivering an inert gas into the product chamber to prevent the product from chemically reacting with other gases within the furnace.

The above and still further objects, features and advantages of the systems and methods described herein will become apparent upon consideration of the following detailed description of specific embodiments thereof, particularly when taken in conjunction with the accompanying drawings, wherein like reference numerals designate like components. These and other objects, features and advantages of the present invention will become apparent from the following description when viewed in accordance with the accompanying drawings.

DETAILED DESCRIPTION OF THE INVENTION

Figure 1:
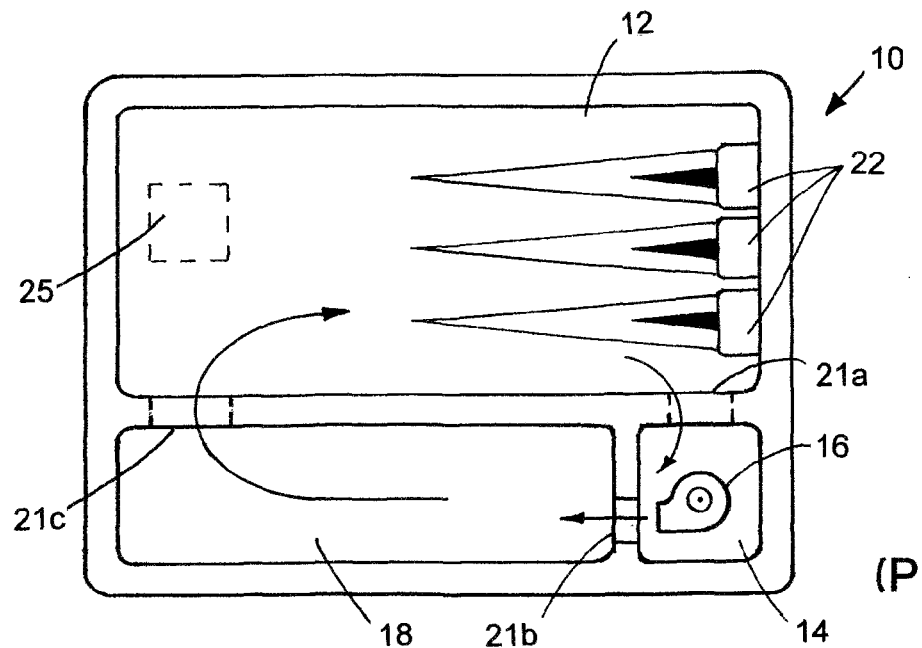
FIG. 1 is a top schematic view of a prior art molten metal furnace.
Figure 2:
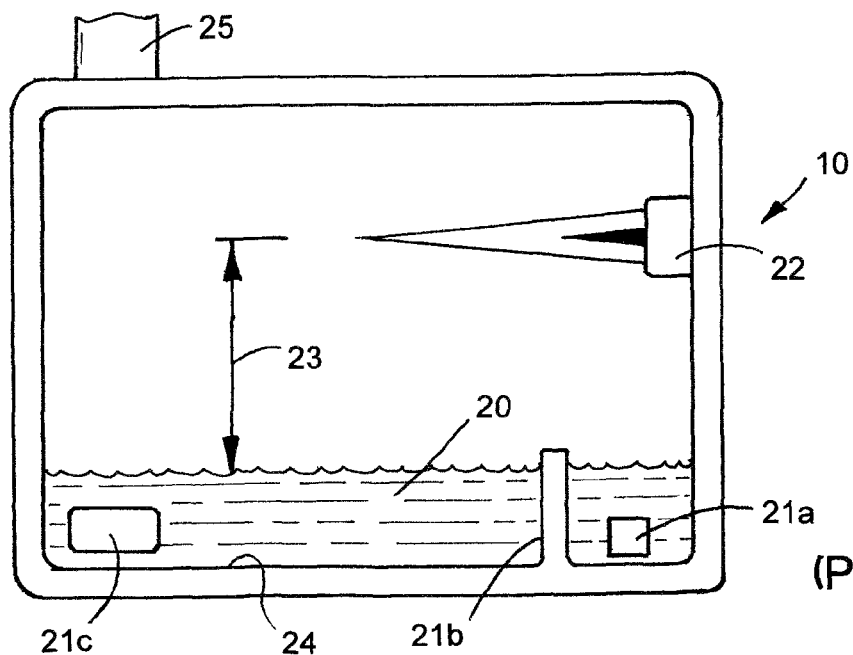
FIG. 2 is a side schematic view of the prior art furnace of FIG. 1.

Referring now to the FIGS., in prior art furnaces, such as the one illustrated in FIGS. 1 and 2, a furnace 10 is shown and is generally shaped as a fluid retaining enclosure. This enclosure includes a heating area or hearth 12, a pump well 14 that contains a molten metal pump 16 and a charge well 18. A bath 20 of molten metal is contained within the furnace. A series of arches 21a, 21b, and 21c fluidly connect the hearth, pump well and charge well allowing the molten metal to flow through the furnace.

During normal operation, the bath 20 is heated in the hearth by a series of burners 22 fueled by a source of oxygen and a carbon-based fuel. The bath 20 is pulled into the pump well by pump 16 and accelerated out from the pump and into the charge well 18 to circulate the molten aluminum 20 through the furnace. As shown, the distance 23 from burners 22 to the melt 20 is typically three to four feet due to the presence of oxygen, which generates dross and because the surface temperature of the aluminum must remain below 1400° F.

Additionally, the burners 22 must be operated at a temperature of approximately 2100° to 2200° F. due to the low emissivity of molten aluminum (0.09 to 0.18). Exhaust fumes and heat exit through a roof mounted chimney or stack 25.

Due to the above constraints along with the temperature gradient of molten aluminum being so great results in the depth of bath 20 being usually less than thirty inches. This relatively shallow bath 20 necessitates that the pump 16 be both large and run at low speeds due to lack of net positive suction head. The resulting low velocity flow from the pump requires longer recirculation times and longer and less effective gas injection times (e.g., chlorine gas injection).

Pump 16 is typically a centrifugal impeller pump adapted to be immersed in molten metal. Pump 16 rotates an impeller to draw in and expel the molten metal forming bath 20. It should be appreciated that while pump 16 is being described as a centrifugal impeller-type of pump, it can be substantially any style pump suitable for use in a molten metal environment.

Figure 3:
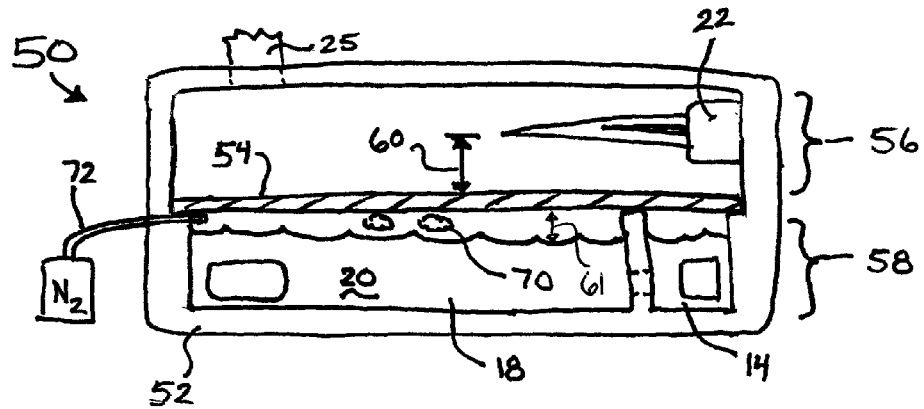
FIG. 3 is a side schematic view of one embodiment of the present invention.
Figure 4:
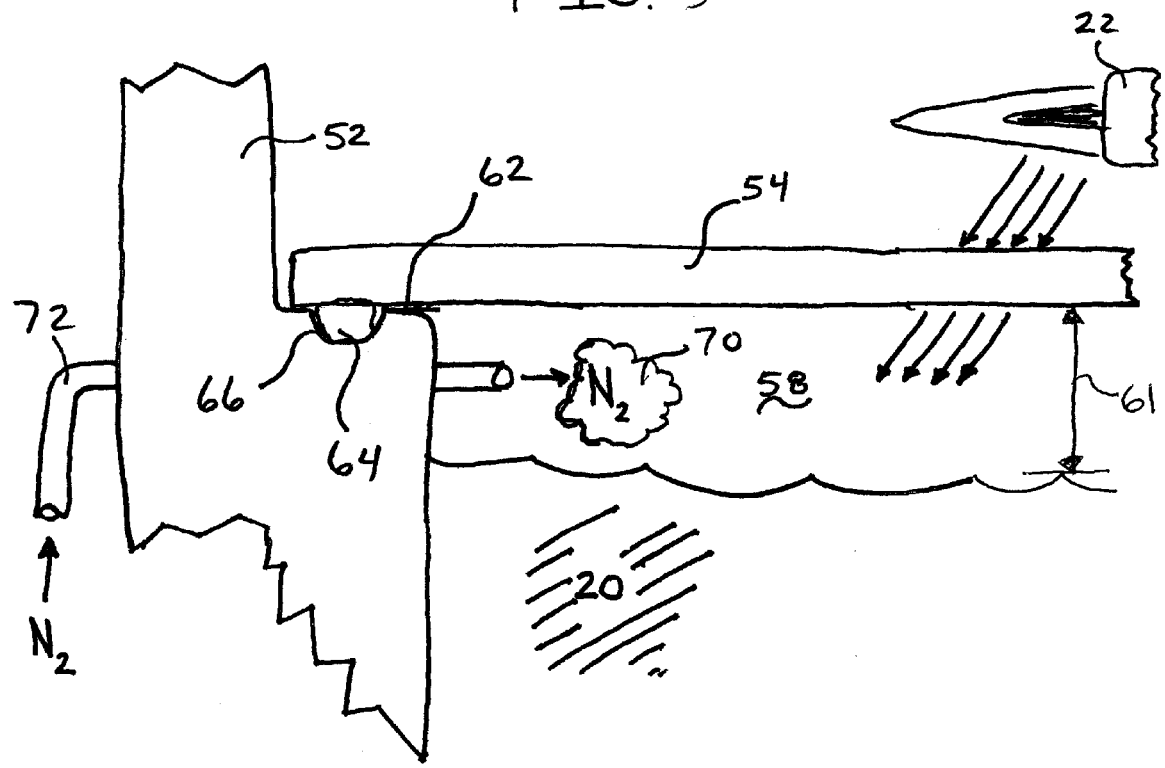
FIG. 4 is an enlarged side sectional view of the interface between the buffer plate and the furnace walls of the embodiment illustrated in FIG. 3.

Referring now more particularly to FIGS. 3 and 4, there is shown an improved molten metal furnace 50. The furnace 50 is made with walls of a refractory material 52. Like the furnace 10 above, the furnace 50 of the present invention includes a hearth, pump well 14, and charge well 18. The furnace 50, however, includes an enlarged buffer plate or shield 54 that separates the furnace into an upper burner chamber 56 and a lower product chamber (aluminum chamber) 58 which contains a bath 20 of molten metal.

In one preferred embodiment, buffer plate 54 is formed from a nickel-based superalloy such Super 22H®, available from Duraloy Technologies, Inc or my previous superalloy formulations, such as my JAM-003 superalloy. Importantly, the superalloy material must have a sufficient amount of nickel content (e.g., at least 15% Ni) to form a layer of nickel oxide upon its outer surface. This black layer of nickel oxide causes the thermal emissivity coefficient of buffer plate 54 to approximately 0.96-0.98 thereby permitting substantially any thermal energy to pass into the plate and emit therefrom with little thermal losses. In other non-limiting embodiments, plate 54 can be substantially any material capable of withstanding temperatures up to 2000° F., while maintaining a suitable yield strength to support itself and forms a layer of nickel oxide (i.e., contains approximately 15-30% Ni).

In one non-limiting embodiment, buffer plate 54 is approximately one inch thick and may include additional supports, such as interconnected webs or flanges, to allow the plate 54 to span the entire length and width of furnace 50.

Importantly, by physically separating the burners 22 from the molten bath 20, buffer plate 54 allows the burners to be moved much closer to the product to be heated. In this manner, the thermal energy from the burners can be transmitted more efficiently (i.e., by both convection and radiation instead of just radiation in the prior art). In the preferred embodiment, the burners 22 can be moved to within approximately one foot of the top of plate 54. It should be appreciated that the thermal energy losses are inversely proportional to the square of the distance between the burners and the heated object. By lowering the burners to within a foot of the plate instead of three feet, the furnace 50 is approximately nine times more efficient than the prior art furnace. The distance 60 between the heated product 20 and the plate 54 is preferably as close as possible. For example, four to eight inches. Likewise, the distance 61 between the bottom of plate 54 and the bath of molten metal is also as close as possible, e.g., three to six inches.

This efficiency is demonstrated by the need to only run the burners 22 at only 1640° F. to maintain/melt molten aluminum at a conventional depth of thirty inches.

As best shown in FIG. 4, the furnace 50 includes an outer, surrounding wall 52 which has flat ledge 62 which runs around the interior of the furnace. Buffer plate 54 is supported vertically by resting upon ledge 62. The product chamber 58 is preferably sealed from burner chamber 56 through the addition of an appropriate gasket material 64, such as Fiberfrax® from Unifrax, LLC that is placed between the plate 54 and ledge 62. In the embodiment shown, the gasket material 64 is located within a recessed channel 66 formed within ledge 62.

To further limit the formation of undesirable by-products in the heated product 20 (e.g, dross within an aluminum bath), furnace 50 further includes means for introducing an inert gas 70 into product chamber 58. This inert gas is injected into the product chamber 58 through piping 72 and is configured such that the gas 70 can be injected to provide a local atmosphere or layer of inerting gas at the surface of the molten metal 20. The composition of gas 70 is primarily nitrogen (e.g., preferably substantially or nearly 100% by volume) in product chamber 58. The sealed inerting layer of nitrogen protects the heated product's surface from the remaining furnace atmosphere and combustion gases.

Furthermore, the inert gas 70 also penetrates and impregnates the porosity of the furnace wall refractory 52 within the product chamber 58. These nitrogen impregnated walls reduce the intrusion of the molten aluminum into the refractory material significantly reducing the erosion of the refractory and improving the service life of the furnace walls/refractory.

Further, as shown in FIG. 3, the overall height of the burner chamber 56 can be substantially reduced (up to 2-4 feet) compared to conventional high temperature furnaces 10, while the lower temperatures (1640° F. versus 2100° F.) increase the service life of the refractory within the burner chamber 56 by nearly 100%.

Lastly, another significant drawback of prior art furnaces is that their operating temperatures produce toxic NOx gases. The present invention, however, operates under 1880° F. and will substantially prevent the formation of NOx and thereby decreases costs and greatly improves safety.

Figure 5:
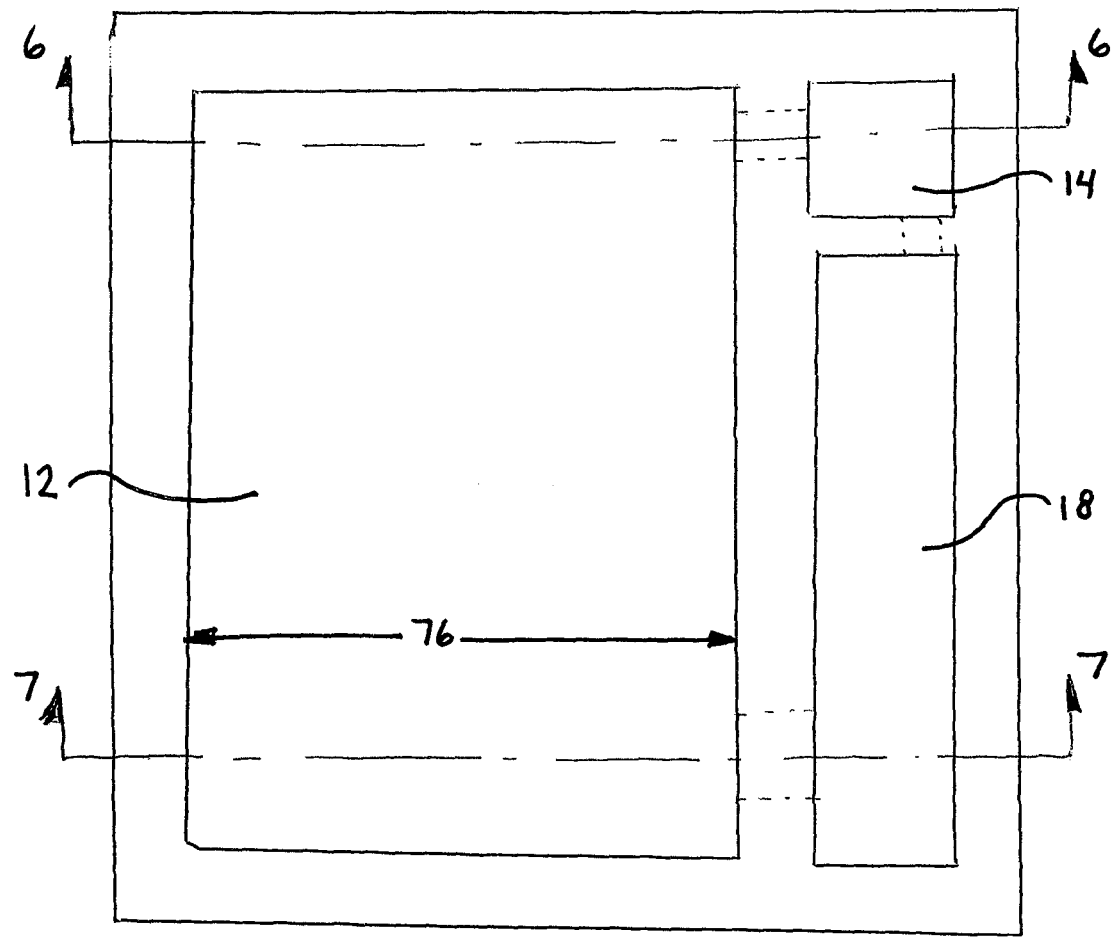
FIG. 5 is a top plan view of the reservoir portion of the present invention.
Figure 6:
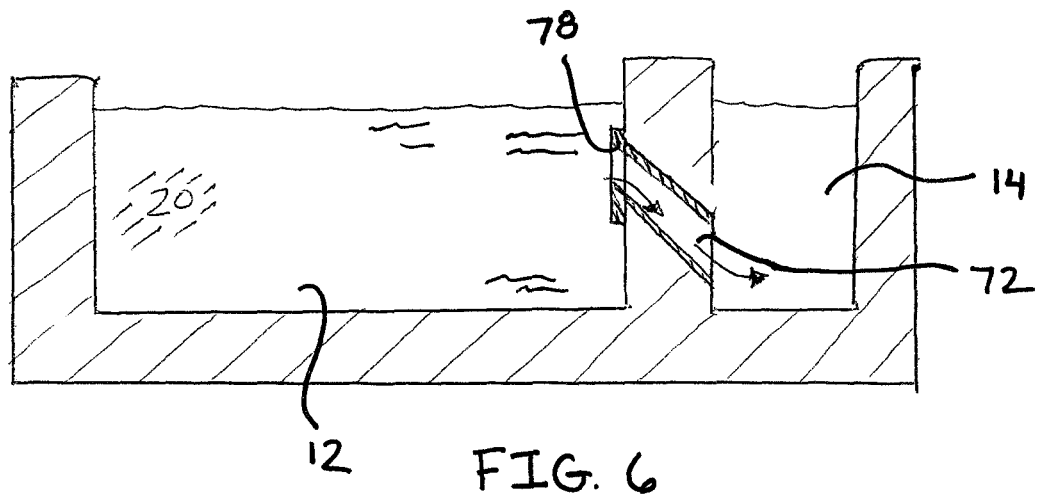
FIG. 6 is a side section view through line 6-6 in FIG. 5.
Figure 7:
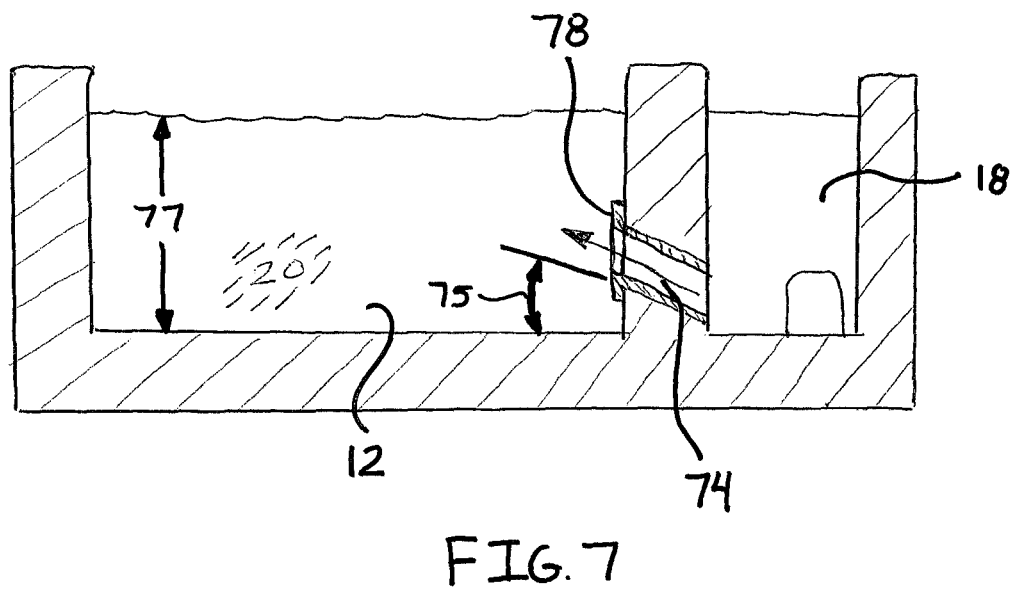
FIG. 7 is a side sectional view through line 7-7 in FIG. 5.

Referring now to FIGS. 5-7, another improvement provided by the present furnace is in the configuration of the passageways (denoted 21a-c in FIGS. 1 and 2) interconnecting the hearth 12, pump well 14 and charge well 18. Unlike the prior art passages, however, not all of the passages of the present invention are substantially horizontal openings formed at or near the floor 24 of the furnace.

As best shown in FIG. 6, the passage 72 formed in the furnace refractory wall that separates the hearth 12 to the pump well 14 is angled downwardly from the hearth to the pump well. The benefit of this angled passage 72 is to draw the molten metal residing at the upper portion of the hearth (i.e., the hottest metal within the hearth) into the pump well 14. This novel configuration of the hearth/pump well passage 72 is a significant improvement over the prior art furnaces, which draw the molten metal nearest the floor 24 of the furnace (i.e., the coolest metal within the hearth) in the pump well. The higher temperature of the molten metal entering the pump well in the present invention improves melting of solid metal inserted downstream of the pump well 14 (e.g., material deposited within the charge well 18).

Passage 74 interconnects the charge well 18 and hearth 12. Like passage 72, this charge/hearth passage 74 is different from prior art passageways as it, too, is angled. Passage 74, however, is angled upwardly from an opening formed at or near the charge well floor. In the preferred embodiment, this angle 75 is between three and fifteen degrees and is based on the dimensional relationship between the width 76 of the furnace and the nominal operating depth 77 of the furnace. The upward incline of passage 74 directs the relatively cool molten metal flowing from the charge well 18 toward the burner heated buffer plate 54, thereby immersing the cooler metal into the hottest region of the molten bath within the hearth 12.

In one preferred non-limiting embodiment, a durable wear resistant liner 78 is inserted within passages 72 and 74. Liners 78 are preferable formed from an appropriate ceramic to eliminate any potential erosion that could otherwise happen to the refractory wall due to the change of direction of the molten metal as it circulates through the furnace.

Figure 8:
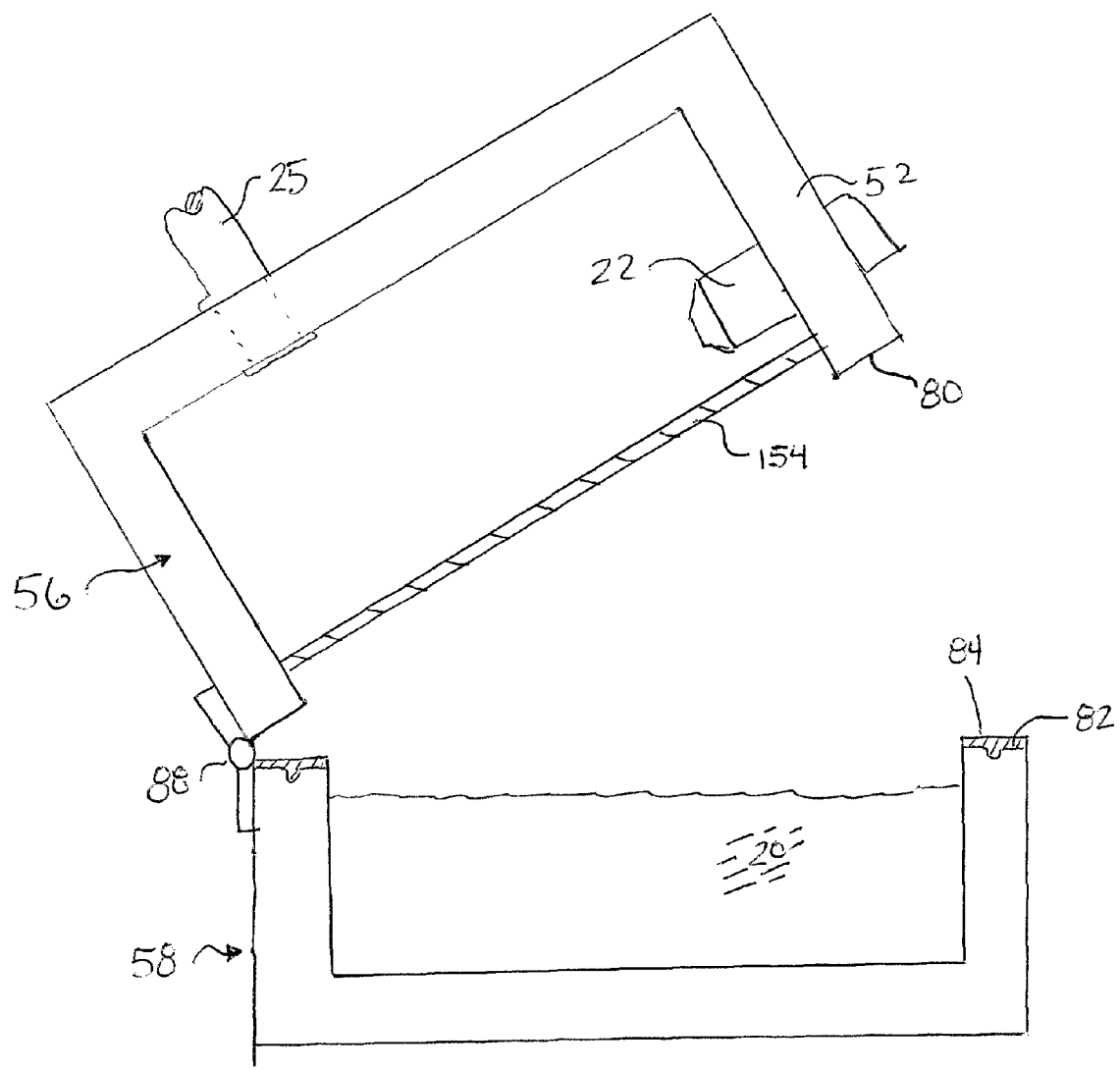
FIG. 8 is a side schematic view of another embodiment of the present invention in a open or cleaning position.
Figure 9:
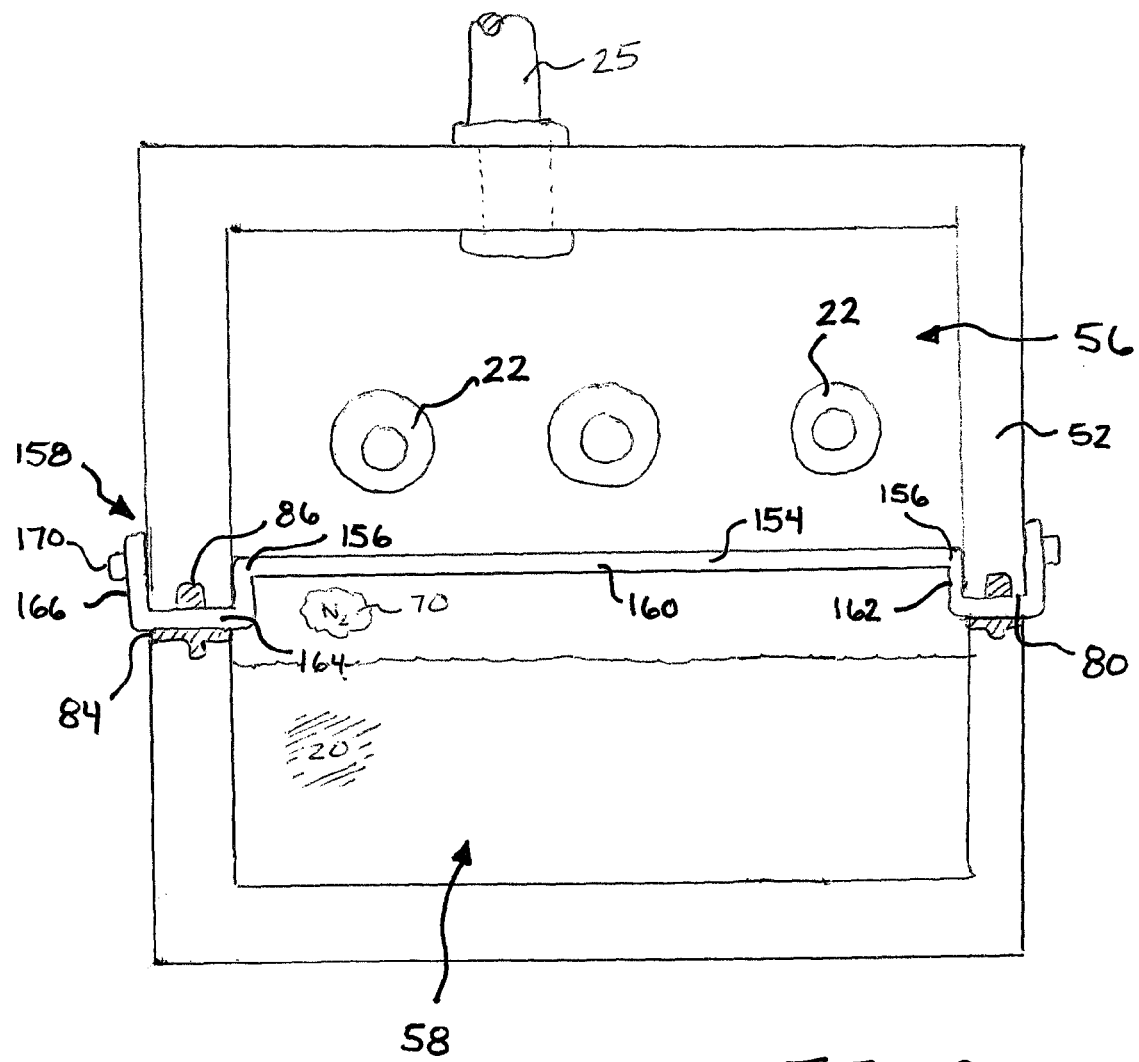
FIG. 9 is a side schematic view of the embodiment illustrated in FIG. 8 showing the furnace sealed by the buffer plate.
Figure 10:
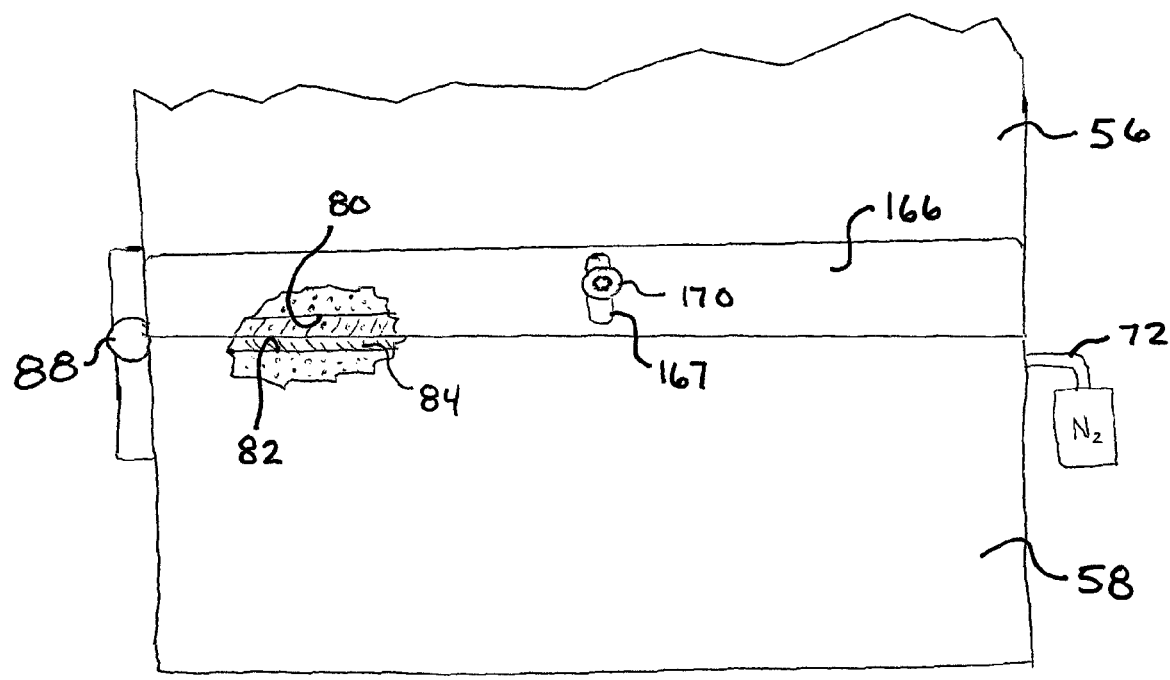
FIG. 10 is a partial side schematic view of the embodiment illustrated in FIGS. 8 and 9 showing the mechanical coupling of the buffer plate to the furnace.

Referring now to FIGS. 8-10 an alternate preferred embodiment of the present invention is depicted with the separate upper burner chamber 56 movable relative to the stationary lower product chamber 58. Particularly, the upper burner chamber 56 is movable from a) an operating position (shown in FIGS. 9 and 10) where the burner chamber 56 is located atop the upper walls of lower chamber 58 to b) a cleaning position (shown in FIG. 8) where the burner chamber 56 is remote from the lower chamber 58 and the inner molten metal reservoir is accessible.

In this embodiment, the vertical refractory walls 52 of the burner chamber 56 terminate at a flat bottom surface 80. Separating and sealing the burner chamber 56 apart from the lower chamber 58 is a buffer plate 154, which apart from the following is identical in design to plate 54 described above. Unlike plate 54, the buffer plate 154 of this embodiment is not substantially flat across its entirety, instead two opposite ends 156 of this plate form channels 158, which receive the lower portions of vertical walls 52 with the bottom surface 80 nested therein.

In the configuration shown in FIGS. 8-10, buffer plate 154 includes the substantially flat, furnace spanning portion 160 and have a inner channel wall 162 depending vertically downwardly from each end 156. A generally horizontal seat portion 164 extends from inner channel wall 162 and spans the thickness of wall surface 80. An outer channel wall 166 projects upwardly from seat 164 to collectively define channel 158. The differing materials of refractory walls 52 and buffer plate 154 necessitate that some additional space or gaps be provided to allow for the differing thermal expansion and retraction of the distinct materials forming chamber 56. The present invention further provides for this expansion by only providing a single mechanical fastener (e.g., bolt 170) retaining the buffer plate 154 to the outer walls of chamber 56. As shown best in FIG. 10, each outer channel wall 166 includes a centrally located (center of mass) vertical slot 167 that is aligned with a threaded opening (not shown) formed in the furnace wall. The mechanical fastener 170 couples the plate 154 to the lower end of burner chamber 56, while allowing for thermal growth in the metal plate.

To ensure a satisfactory seal is formed, the upper surface 82 of the lower burner chamber's refractory walls include gasket or seal 84 formed from an appropriate material, such as material 64 discussed above. When positioned in the operating position, burner chamber 56 and buffer plate 154 rest atop the upper surface 82 of lower chamber 58 sealing the furnace from the ambient atmosphere. Similarly, another gasket 86 is positioned between surface 80 and the upper surface of plate 154.

In the embodiment illustrated, the upper burner chamber 56 is movable apart from lower chamber 58 by a hinged connection 88, which permits the upper chamber to pivot upwardly from the lower chamber 58. In other non-limiting embodiments, the hinged connection could be replaced by a crane or chainfall which physically lifts the upper chamber 56 away from the lower chamber 58.

This invention is not to be limited by the embodiment shown in the drawings and described in the description, which is given by way of example and not of limitation.

From the foregoing description, one skilled in the art will readily recognize that the present invention is directed to an improved furnace that sealingly separates the furnace's burners from the product to be heated with an enlarged superalloy buffer plate. The buffer plate permitting the burners to be moved much closer to the product to be heated than previously possible and allowing the formation of a chamber containing the heated product that may be filled with an inert gas to reduce the formation of undesirable waste by-products within the melt. While the present invention has been described with particular reference to various preferred embodiments, one skilled in the art will recognize from the foregoing discussion and accompanying drawing that changes, modifications and variations can be made in the present invention without departing from the spirit and scope thereof.

The invention claimed is:

1. An improved molten metal furnace comprising:
    a molten metal reservoir adapted to retain a bath of molten metal;
    at least one heater proximate to said reservoir, wherein said at least one heater is surrounded by an atmosphere comprising air and heater exhaust gases; and
    a buffer plate disposed between said bath of molten metal and said at least one heater, wherein said buffer plate seals and separates said molten metal bath from said heater atmosphere;
    wherein said at least one heater generates sufficient heat to melt a metal which makes up said molten metal bath, said heat passing through said buffer plate to said molten metal bath; and
    wherein said buffer plate is a superalloy having an emissivity of approximately 0.96-0.98.

2. The improved molten metal furnace as defined in claim 1, wherein said superalloy has an iron composition of at least 15%, producing a layer of iron oxide upon an exterior surface facing said at least one heater.

3. An improved molten metal furnace comprising:
    a molten metal reservoir adapted to retain a bath of molten metal, said reservoir including a walls which cooperatively define a hearth, a pump well, and a charge well and a separate passageway interconnects each of said hearth, pump well and charge well;
    at least one heater proximate to said reservoir, wherein said at least one heater is surrounded by an atmosphere comprising air and heater exhaust gases; and
    a superalloy buffer plate having an emissivity of approximately 0.960.98 which is disposed between said bath of molten metal and said at least one heater, wherein said buffer plate seals and separates said molten metal bath from said heater atmosphere;
    wherein said at least one heater generates sufficient heat to melt a metal which makes up said molten metal bath, said heat passing through said buffer plate to said molten metal bath;
    wherein the passageway interconnecting the hearth to the pump well is angled downwardly from a region adjacent to a metal line of said molten metal bath toward a floor of said reservoir;
    wherein the passageway interconnecting the charge well to the hearth is angled upwardly from a region proximate to a floor of said charge well into said hearth.

4. The improved molten metal furnace as defined in claim 3, wherein said buffer plate seals said molten metal reservoir and cooperatively defines an enclosed cavity between said molten metal and said buffer plate, wherein an inert gas fills said enclosed cavity.

5. The improved molten metal furnace as defined in claim 3, wherein said superalloy has an iron composition of at least 15%, producing a layer of iron oxide upon an exterior surface facing said at least one heater.

6. The improved molten metal furnace as defined in claim 3, wherein said heater portion includes downwardly projecting furnace walls which cooperatively define a heater cavity;
    wherein said buffer plate has a generally flat cover portion which spans said reservoir portion, wherein at least two ends of said buffer plate form a channel which receive one of said downwardly projecting furnace walls.

7. The improved molten metal furnace as defined in claim 6, wherein each of said channels includes an outer channel wall which is adjacent to a surface of said downwardly projecting furnace wall, wherein said buffer plate is coupled to said heater portion through only a single fastener passing through each of said outer channel walls.

8. The improved molten metal furnace as defined in claim 3, wherein said buffer plate permits said at least one heater to be mounted less than two feet from an upper metal line of said molten metal bath.

9. The improved molten metal furnace as defined in claim 3, wherein
    said at least one heater is mounted between six to twelve inches from said buffer plate.

10. The improved molten metal furnace as defined in claim 3 comprising ceramic liners seated within both the passageway interconnecting the hearth to the pump well and the passageway interconnecting the charge well to the hearth.

* * * * *